United States Patent
Li et al.

(10) Patent No.: US 12,454,587 B2
(45) Date of Patent: Oct. 28, 2025

(54) PREPARATION OF BIMETALLIC CATALYST BASED ON ANTHRACENE FRAMEWORKS AND USE THEREOF IN OLEFIN HIGH TEMPERATURE SOLUTION POLYMERIZATION

(71) Applicants: Qingdao University of Science and Technology, Shandong (CN); Shandong Chambroad Petrochemicals Co., Ltd., Shandong (CN)

(72) Inventors: Zhibo Li, Shandong (CN); Yunsheng Ma, Shandong (CN); Shaofeng Liu, Shandong (CN); Bo Luan, Shandong (CN); Yanhong Xing, Shandong (CN); Yongchen Zhao, Shandong (CN); Jinbo Zhang, Shandong (CN); Jiashuai Liu, Shandong (CN)

(73) Assignees: Qingdao University of Science and Technology, Shandong (CN); Shandong Chambroad Petrochemicals Co., Ltd., Shandong (CN)

( * ) Notice: Subject to any disclaimer, the term of this patent is extended or adjusted under 35 U.S.C. 154(b) by 511 days.

(21) Appl. No.: 18/010,282

(22) PCT Filed: Nov. 2, 2021

(86) PCT No.: PCT/CN2021/128225
§ 371 (c)(1),
(2) Date: Dec. 14, 2022

(87) PCT Pub. No.: WO2022/242045
PCT Pub. Date: Nov. 24, 2022

(65) Prior Publication Data
US 2023/0242686 A1     Aug. 3, 2023

(30) Foreign Application Priority Data
May 19, 2021 (CN) .......................... 202110550887.1

(51) Int. Cl.
C08F 10/02 (2006.01)
C07F 7/00 (2006.01)
C07F 7/28 (2006.01)
C08F 4/64 (2006.01)

(52) U.S. Cl.
CPC ................ C08F 10/02 (2013.01); C07F 7/00 (2013.01); C07F 7/003 (2013.01); C07F 7/28 (2013.01); C08F 4/64048 (2013.01); *C08F 2410/03* (2013.01)

(58) Field of Classification Search
None
See application file for complete search history.

(56) References Cited

U.S. PATENT DOCUMENTS

2013/0137841 A1* 5/2013 Luo .......................... C08F 10/00
526/172

* cited by examiner

*Primary Examiner* — Christopher M Rodd
(74) *Attorney, Agent, or Firm* — Muncy, Geissler, Olds & Lowe, P.C.

(57) ABSTRACT

A preparation method of bimetallic catalysts based on anthracene frameworks and use thereof in olefin polymerization is reported. Anthrecene frameworks were introduced, heat resistance of the catalysts is improved, and by changing central metals and configurations of the frameworks, steric and electronic effects of the metal catalysts of this model can be adjusted and controlled conveniently, and polyolefin polymer materials of different structures and different properties can be prepared, the bimetallic catalyst can be used in ethylene homopolymerization for preparation of high density polyethylene, ethylene/1-octene copolymerization for preparation of polyolefin elastomers and ethylene/norbornene copolymerization for preparation of cycloolefin copolymers. The bimetallic catalyst based on anthracene frameworks can be used in olefin high temperature solution polymerization for preparing polyolefin elastomers and cycloolefin copolymers, the polyolefin elastomers obtained have molecular weights as high as $M_w$=890 kg·mol$^{-1}$, and the cycloolefin copolymers have copolymerization monomer insertion rates as high as 45 mol %.

8 Claims, 1 Drawing Sheet

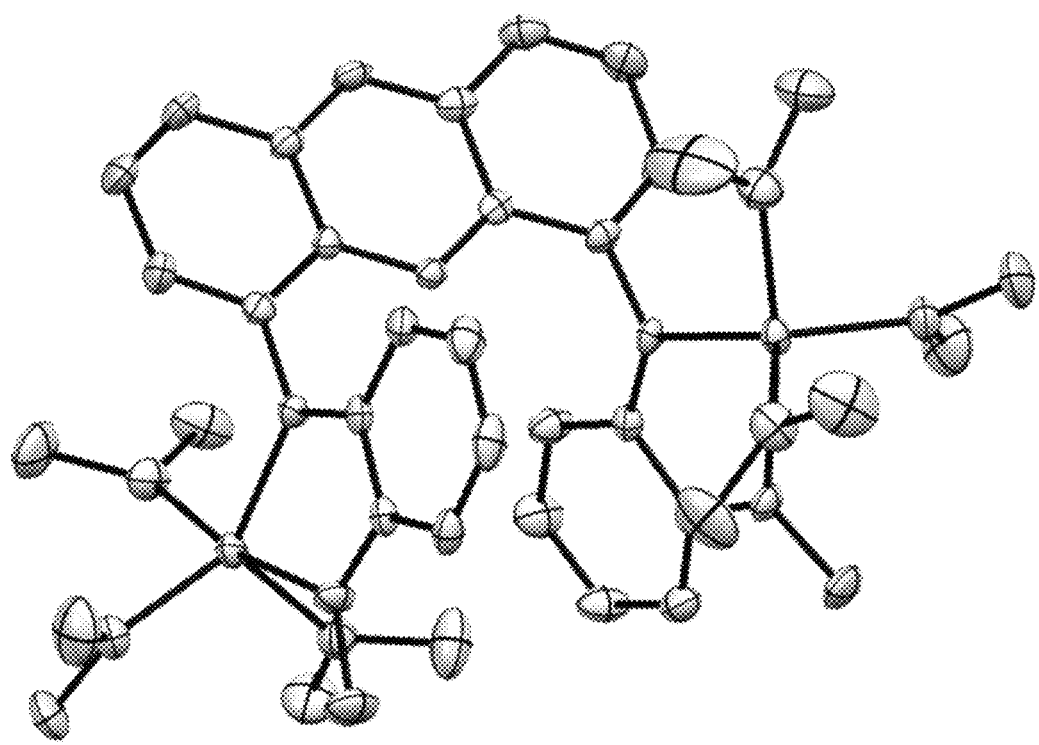

PREPARATION OF BIMETALLIC CATALYST BASED ON ANTHRACENE FRAMEWORKS AND USE THEREOF IN OLEFIN HIGH TEMPERATURE SOLUTION POLYMERIZATION

TECHNICAL FIELD

The present invention relates to preparation of bimetallic catalyst based on anthracene frameworks and use thereof in olefin high temperature solution polymerization.

BACKGROUND TECHNOLOGY

Polymeric materials are supporting columns of development of modern sciences and technologies, and have become indispensable materials in fields such as sophisticated sciences and technologies, national defense construction and national economy. Among polymeric materials, polyolefin is a kind of synthetic resin with the fastest development, highest production and widest application range. Industrialized polyethylene catalysts include Ziegler-Natta catalysts (DE 889229(1953), IT 545332(1956) and IT 536899 (1955)); Phillips catalysts (Belgium patent 530617 (1955)), metalorganic catalysts (W. Kaminsky, Metalorganic Catalysts for Synthesis and Polymerization, Berlin: Springer, 1999), and high efficiency ethylene homopolymerization and co-polymerization catalysts such as transition metal complexes developed in recent years. High temperature resistant catalysts are the key to preparation of polyolefin elastomers (POE) by high temperature solution polymerization. The most important catalyst is the constrained geometry addition polymerization catalyst reported by Dow Chemical Co (EP0416815A2). In the year 2011, Jerzy seminar and in the year 2012 Philip P seminar respectively reported olefin polymerization catalyzed by iminoamido Hf and Zr complexes (Organometallics 2011, 30, 251-262; Organometallics 2012, 31, 6244-6251), catalyzed ethylene and octene copolymerization can have high activities, and the catalysts are high temperature resistant and applicable to high temperature solution polymerization. Bimetallic catalysts can improve catalysis performance of catalysts by synergistic catalytic effects (Organaometallics 2020, 39, 3268-3274).

In the present invention a preparation method of bimetallic catalysts based on anthracene frameworks and use thereof in olefin polymerization is reported. In the present invention, anthrecene frameworks were introduced, heat resistance properties of the catalysts are improved, and by changing central metals and configurations of the frameworks, steric and electronic effects of the metal catalysts of this model can be adjusted and controlled conveniently, different catalytic performances can be realized and polyolefin polymer materials of a variety of structures and a variety of properties can be prepared. The novel bimetallic catalyst based on anthracene frameworks is characterized by being of preparation ease, high activity, heat resistance and good copolymerization performance, can be used in olefin high temperature solution polymerization for preparing polyolefin elastomers and cycloolefin and a-olefin copolymers, the polyolefin elastomers obtained have higher molecular weights, and the cycloolefin and a-olefin copolymers have higher copolymerization monomer insertion rates. Therefore, the bimetallic catalyst based on anthracene frameworks has original creativity and can enhance our competition strength in the international high end polyolefin polymer material market.

SUMMARY OF INVENTION

A purpose of the present invention is to provide a preparation method of bimetallic catalyst based on anthracene frameworks and use thereof in olefin polymerization.

The present invention provides a bimetallic catalyst based on anthracene frameworks as shown in formula (I):

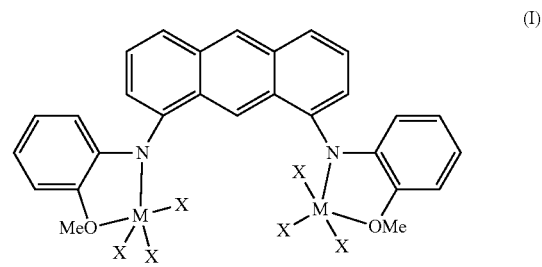

Wherein, M is selected from titanium, zirconium and hafnium; and X is selected from methyl, chlorine and dimethylamino.

Preferably, the bimetallic catalyst based on anthracene frameworks is selected from any of following compositions: syn-Hf$_2$:M=Hf, X=NMe$_2$; syn-Zr$_2$:M=Zr, X=NMe$_2$; syn-Ti$_2$:M=Ti, X=NMe$_2$.

The present invention further provides a preparation method of the bimetallic catalyst based on anthracene frameworks, comprising the following steps:

under a nitrogen atmosphere, adding Pd(OAc)$_2$ (89 mg, 0.4 mmol), dppf (0.456 g, 0.8 mmol), 1,8-dichrloroanthracene (1.24 g, 5 mmol), 2-anisidine (1.85 g, 15 mmol) and Cs$_2$CO$_3$ (4.78 g, 15 mmol) into a 200 mL two-neck flask, adding methylbenzene 50 mL, refluxing and reacting for 12-24 hours. Adding water and ethyl acetate for extraction, removing water in an organic phase, pressurizing and removing solvents; purifying a product by column chromatography, wherein eluting reagents are petroleum ether and ethyl acetate with a volume ratio of 1~20:1, and an organic ligand can be obtained; dissolving the organic ligand in a nonaqueous solvent, adding (NMe$_2$)$_4$ 2-3 molar equivalents, reacting for 12-24 hours; vacuumizing and removing solvents, washing with a poor solvent and obtaining the bimetallic catalyst based on anthracene frameworks.

In the foregoing preparation method, the nonaqueous solvent is selected from benzene, methylbenzene, dimethylbenzene and n-hexane; and the poor solvent is selected from n-hexane, pentane, n-heptane and cyclohexane.

The present invention further provides use of the bimetallic catalyst based on anthracene frameworks in catalyzing olefin polymerization reaction.

In the foregoing use, the olefin is any one or combination of ethylene, propylene, phenyl ethylene, 1-butylene, 1-hexylene, 1-octylene, norbornene, cyclohexene and TCD monomer.

The catalyst further comprises a cocatalyst, wherein the cocatalyst is any one or combination of tri(pentafluorophenyl) borane, trityl tetrakis(pentafluorophenyl)borate, aluminoxide, alkyl aluminum and aluminium alkyl chloride. The aluminoxide comprises methyl aluminium oxane, ethylaluminoxane or isobutylaluminoxane; alkyl aluminium comprises trimethyl aluminium, triethylaluminium or tri-n-hexyl aluminum; and the aluminium alkyl chloride comprises aluminium diethyl monochloride, diethylaluminum sesquichloride or ethylaluminium dichloride.

In the foregoing polymerization reaction, polymerization temperature is 0-180° C., polymerization pressure 0.1-5 Mpa, polymerization solvent is any one or combination of methylbenzene, hexane and heptane. The present invention provides preparation of the bimetallic catalyst based on anthracene frameworks and use thereof in catalyzing olefin polymerization. The novel bimetallic catalyst based on anthracene frameworks reported in the present invention is characterized by being of preparation ease, high activity, heat resistance and good polymerization performances, and is suitable for use in preparation of polyolefin elastomers and cycloolefin and a-olefin copolymers.

BRIEF DESCRIPTION OF DRAWINGS

The sole FIGURE is a crystal structural diagram of the ligand syn-$Hf_2$.

EMBODIMENTS

Hereinafter the present invention will be further described with some embodiments, however, the present invention is not limited to the embodiments disclosed herein. The embodiments in the present invention can help those skilled in the art understand the present invention comprehensively.

Experimental methods used in the following embodiments are common methods unless indicated otherwise.

Hereinafter the present invention will be described with some embodiments.

Embodiment 1 Preparation of Composition Syn-$Hf_2$

Under nitrogen atmosphere, adding $Pd(OAc)_2$ (89 mg, 0.4 mmol), dppf (0.456 g, 0.8 mmol), 1,8-dichrloroanthracene (1.24 g, 5 mmol), 2-anisidine (1.85 g, 15 mmol) and $Cs_2CO_3$ (4.87 g, 15 mmol) into a 200 mL two-neck flask, adding methylbenzene 50 mL, and refluxing for 12-24 hours. Adding water and ethyl acetate for extraction, removing water in an organic phase, pressurizing to remove the solvent; purifying a product by column chromatography, wherein eluting reagents are petroleum ether and ethyl acetate with a volume ratio of 1~20:1, and organic ligand 1.42 g is obtained; taking the organic ligand (0.42 g, 1 mmol) and dissolving in a nonaqueous solution, adding $Hf(NMe_2)_4$ 2.2 mmol, reacting for 24 hours; depressurizing to remove the solvent, washing with n-hexane and obtaining bimetallic catalyst based on anthracene frameworks syn-$Hf_2$ (0.93 g, 0.9 mmol, 90% yield). $^1H$ NMR (400 MHz, $C_6D_6$) δ 9.02 (s, 1H), 8.45 (s, 1H), 7.74 (d, J=8.5 Hz, 2H), 7.50-7.28 (m, 2H), 7.05 (d, J=6.7 Hz, 2H), 6.73 (t, J=7.4 Hz, 2H), 6.63-6.48 (m, 4H), 6.24 (d, J=8.0 Hz, 2H), 3.62 (s, 6H), 3.12-2.03 (br, 36H). $^{13}C$ NMR (100 MHz, $C_6D_6$) δ 148.04, 147.71, 147.53, 133.69, 131.57, 128.19, 126.13, 125.24, 124.45, 122.84, 118.84, 115.28, 115.23, 108.62, 56.37, 41.61 (br), Anal. Calcd for $C_{40}H_{58}N_8O_2Hf_2$:C, 46.21; H, 5.62; N, 10.78. Found: C, 45.98; H, 5.45; N, 10.66.

Embodiment 2 Preparation of Composition syn-$Zr_2$

Using the same method as the method used in embodiment 1, replacing $Hf(NMe_2)_4$ with $Zr(NMe_2)_4$, and the bimetallic catalyst based on anthracene frameworks syn-$Zr_2$ (0.73 g, 0.84 mmol, yield 84%) is obtained. $^1H$ NMR (400 MHz, $C_6D_6$) δ 9.05 (S, 1H), 8.45 (S, 1H), 7.74 (d, J=8.5 Hz, 2H), 7.47-7.30 (m, 2H), 7.08 (d, J=6.8 Hz, 2H), 6.74 (t, J=7.4 Hz, 2H), 6.58 (t, J=12.1 Hz, 4H), 6.26 (d, J=8.0 Hz, 2H), 3.58 (s, 6H), 2.93-2.27 (br, 36H). $^{13}C$ NMR($C_6D_6$) δ 148.08, 147.77, 147.56, 133.80, 131.49, 127.94, 126.21, 124.97, 124.25, 122.27, 118.90, 114.95, 114.57, 108.54, 56.00, 41.91. Anal. Calcd for $C_{40}H_{58}N_8O_2Zr_2$:C, 55.52; H, 6.76; N, 12.95. Found: C, 55.33; H, 6.65; N, 12.78.

Embodiment 3 Preparation of Composition syn-$Ti_2$

Using the same method as the method used in embodiment 1, replacing $Hf(NMe_2)_4$ with $Ti(NMe_2)_4$, the bimetallic catalyst based on anthracene frameworks (0.68 g, 0.87 mmol, 87% yield) can be obtained. $^1H$ NMR (400 MHz, $C_6D_6$) δ 8.51 (s, 1H), 8.35 (s, 1H), 7.61 (d, J=8.6 Hz, 2H), 7.34-7.30 (m, 2H), 6.75 (d, J=9.1 Hz, 4H), 6.58 (t, J=7.6 Hz, 2H), 6.49 (t, J=7.6 Hz, 2H), 5.76 (d, J=9.3 Hz, 2H), 3.81 (s, 6H), 3.01 (s, 12H), 2.52 (s, 12H), 1.88 (s, 12H). NMR (100 MHz, $C_6D_6$) δ 150.13, 148.11, 147.15, 133.56, 130.62, 127.61, 126.11, 124.51, 123.63, 121.32, 120.04, 115.44, 113.29, 108.07, 55.51, 47.76, 44.60, 44.18. Anal. Calcd for $C_{60}H_{58}N_8O_2Ti_2$: C, 61.70; H, 7.51; N, 14.39. Found: C, 61.53; H, 7.34; N, 14.03.

Embodiment 4 syn-$Hf_2$ Catalyzing Ethylene Polymerization

Drying a 250 mL polymerization flask equipped with a magnetic stirrer for 6 hours at 120° C., vacuumizing when it is still hot, evacuating and refilling $N_2$ gas for three times. Adding syn-$Hf_2$ 2.08 mg (2 μmol), adding MAO, so that Al/Ti=2000. Vacuumizing again and evacuating and refilling $N_2$ gas for three times. Injecting methyl benzene 50 mL with a syringe, at 100° C., maintaining an ethylene pressure of 5 atm, and mixing violently for 2 min. Neutralizing the reaction solution with ethanol solution acidified with hydrochloric acid 5%, obtaining polymer precipitates, washing with ethanol and water for several times, vacuum drying until constant weight, and weighing. Polymerization activity: $4.2 \times 10^6$ g·mol$^{-1}$(Ti)·h$^{-1}$. Polymer $M_W$=770 kg·mol$^{-1}$, $M_W/M_n$=2.2.

Embodiment 5 syn-$Zr_2$ Catalyzing Ethylene Polymerization

Drying a 250 mL polymerization flask equipped with a magnetic stirrer for 6 hours at 120° C., vacuumizing when it is still hot, evacuating and refilling $N_2$ gas for three times. Adding syn-$Zr_2$ 1.73 mg (2 μmol), adding MAO, so that Al/Ti=2000. Vacuumizing again and evacuating and refilling $N_2$ gas for three times. Injecting methyl benzene 50 mL with a syringe, at 100° C., maintaining an ethylene pressure of 5 atm, and mixing violently for 2 min. Neutralizing the reaction solution with ethanol solution acidified with hydrochloric acid 5%, obtaining polymer precipitates, washing with ethanol and water for several times, vacuum drying until constant weight, and weighing. Polymerization activity: $3.1 \times 10^6$ g·mol$^{-1}$(Ti)·h$^{-1}$. Polymer $M_W$=550 kg·mol$^{-1}$, $M_W/M_n$=2.8.

Embodiment 6 syn-$Ti_2$ Catalyzing Ethylene Polymerization

Drying a 250 mL polymerization flask equipped with a magnetic stirrer for 6 hours at 120° C., vacuumizing when it is still hot, evacuating and refilling N$_2$ gas for three times. Adding syn-Zr$_2$ 1.56 mg (2 μmol), adding MAO, so that Al/Ti=2000. Vacuumizing again and evacuating and refilling N$_2$ gas for three times. Injecting methyl benzene 50 mL with a syringe, at 100° C., maintaining an ethylene pressure of 5 atm, and mixing violently for 2 min. Neutralizing the reaction solution with ethanol solution acidified with hydrochloric acid 5%, obtaining polymer precipitates, washing with ethanol and water for several times, vacuum drying until constant weight, and weighing. Polymerization activity: 0.5×10$^6$ g·mol$^{-1}$(Ti)·h$^{-1}$. Polymer M$_w$=150 kg·mol$^{-1}$, M$_w$/M$_n$=2.1.

Embodiment 7 syn-Hf$_2$ Catalyzing Ethylene and 1-octene polymerization

Drying a high pressure polymerization kettle at 120° C. for 6 hours continuously, vacuumizing while the kettle is still hot and evacuating and refilling N$_2$ gas for three times. Adding methyl benzene 150 g, 1-octene 110 g and MAO 4 mmol. Heating until 140° C., pressurizing ethylene to 4.0 MPa. Adding methyl benzene solution 2.08 mg (2 μmop syn-Hf$_2$ into a feeding hopper, adding the same into the polymerization kettle via high pressure nitrogen, copolymerizing for 10 minutes. Terminating the reaction with ethanol 5 mL, after cooling, depressurizing, introducing the reaction liquid into the ethanol and obtaining polymer precipitates, washing several times with ethanol and water, vacuum drying until constant weight, and weighing. Polymerization activity: 2.1×10$^7$ g·mol$^{-1}$(Ti)·h$^{-1}$. Polymer M$_w$=890 kg·mol$^{-1}$, M$_w$/M$_n$=2.2, and an insertion rate of 1-octene 12.5 mol %.

Embodiment 8

Drying a 250 mL polymerization flask equipped with a magnetic stirrer for 6 hours at 120° C., vacuumizing when it is still hot, evacuating and refilling N$_2$ gas for three times. Adding syn-Hf$_2$ 2.08 mg (2 μmol), and adding MAO, so that Al/Ti=2000. Vacuumizing again and evacuating and refilling N$_2$ gas for three times. Injecting methyl benzene 50 mL with a syringe, at 100° C., adding norbornene 200 mmol, maintaining an ethylene pressure of 5 atm, and mixing violently for 2 min. Neutralizing the reaction solution with ethanol solution acidified with hydrochloric acid 5%, obtaining polymer precipitates, washing with ethanol and water for several times, vacuum drying until constant weight, and weighing.

Polymerization activity: 6.5×10$^6$ g·mol$^{-1}$(Ti)·h$^{-1}$. Polymer M$_w$=40 kg·mol$^{-1}$, M$_w$/M$_n$=3.4, and a norbornene insertion rate is 45 mol %.

The invention claimed is:

1. A bimetallic catalyst based on anthracene frameworks as shown in formula (I):

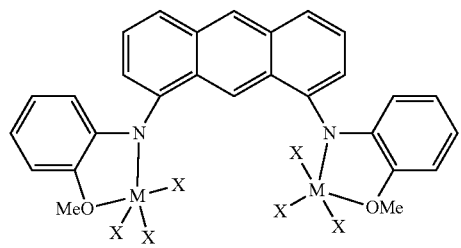

wherein, M is selected from titanium, zirconium and hafnium; and X is selected from methyl, chlorine and dimethylamino.

2. A preparation method of the bimetallic catalyst based on anthracene frameworks as defined in claim 1, comprising following steps:

under a nitrogen atmosphere, adding Pd(OAc)$_2$ (89 mg, 0.4 mmol), dppf (0.456 g, 0.8 mmol), 1,8-dichrloroanthracene (1.24 g, 5 mmol), 2-anisidine (1.85 g, 15 mmol) and Cs$_2$CO$_3$ (4.78 g, 15 mmol) into a 200 mL two-neck flask, adding methylbenzene 50 mL, refluxing and reacting for 12-24 hours; adding water and ethyl acetate for extraction, removing water in an organic phase, pressurizing and removing solvents; purifying a product by column chromatography, wherein eluting reagents are petroleum ether and ethyl acetate with a volume ratio of 1~20:1, and an organic ligand can be obtained; dissolving the organic ligand in a nonaqueous solvent, adding (NMe$_2$)$_4$ 2-3 molar equivalents, reacting for 12-24 hours; vacuumizing and removing solvents, washing with a poor solvent and obtaining the bimetallic catalyst based on anthracene frameworks.

3. The preparation method of the bimetallic catalyst based on anthracene frameworks as defined in claim 2, wherein the nonaqueous solvent is selected from benzene, methylbenzene, dimethylbenzene and n-hexane; and the poor solvent is selected from n-hexane, pentane, n-heptane and cyclohexane.

4. A method for conducting olefin polymerization reaction, wherein a catalyst used in the polymerization reaction is the bimetallic catalyst based on anthracene frameworks as defined in claim 1.

5. The method for conducting olefin polymerization reaction as defined in claim 4, wherein the olefin is any one or combination of ethylene, propylene, phenyl ethylene, 1-butylene, 1-hexylene, 1-octylene, norbornene, cyclohexene and TCD monomer.

6. The method for conducting olefin polymerization reaction as defined in claim 4, wherein the catalyst further comprises a cocatalyst, wherein the cocatalyst is any one or combination of tri(pentafluorophenyl) borane, trityl tetrakis (pentafluorophenyl)borate, aluminoxide, alkyl aluminum and aluminium alkyl chloride.

7. The method for conducting olefin polymerization reaction as defined in claim 6, wherein the aluminoxide comprises methyl aluminium oxane, ethylaluminoxane or isobutylaluminoxane; alkyl aluminium comprises trimethyl aluminium, triethylaluminium or tri-n-hexyl aluminum; and the aluminium alkyl chloride comprises aluminium diethyl monochloride, diethylaluminum sesquichloride or ethylaluminium dichloride.

8. The method for conducting olefin polymerization reaction as defined in claim 4, wherein polymerization temperature is 0-180° C., polymerization pressure 0.1-5 Mpa, polymerization solvent is any one or combination of methylbenzene, hexane and heptane.

* * * * *